(12) United States Patent
Raves

(10) Patent No.: US 6,378,119 B1
(45) Date of Patent: Apr. 23, 2002

(54) METHOD AND SYSTEM FOR ADAPTIVE COMPONENT PLACEMENT

(75) Inventor: David Michael Raves, Lago Vista, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/318,108

(22) Filed: May 24, 1999

(51) Int. Cl.⁷ .............................. G06F 17/50; H02B 1/00; H05K 13/00

(52) U.S. Cl. ............................... 716/10; 716/2; 361/600; 312/223.1

(58) Field of Search .................................. 716/1, 2, 8, 9, 716/10; 361/600, 679–686; 312/223.1, 223.2, 223.3; 706/45, 46, 47

(56) References Cited

U.S. PATENT DOCUMENTS 5,267,176 A * 11/1993 Antreich et al. ............. 364/491
5,745,363 A * 4/1998 Rostoker et al. ........ 364/468.28

FOREIGN PATENT DOCUMENTS

WO       WO 98/43147       10/1998

* cited by examiner

Primary Examiner—Matthew Smith
Assistant Examiner—Leigh Marie Garbowski
(74) Attorney, Agent, or Firm—Baker Botts L.L.P.

(57) ABSTRACT

A method and system for adaptive component placement are disclosed. The method comprises generating a configuration. The configuration comprises a placement of components within a rack. The method further comprises computing a center of gravity of the configuration. The method also comprises determining if the center of gravity exceeds a maximum center of gravity.

19 Claims, 3 Drawing Sheets

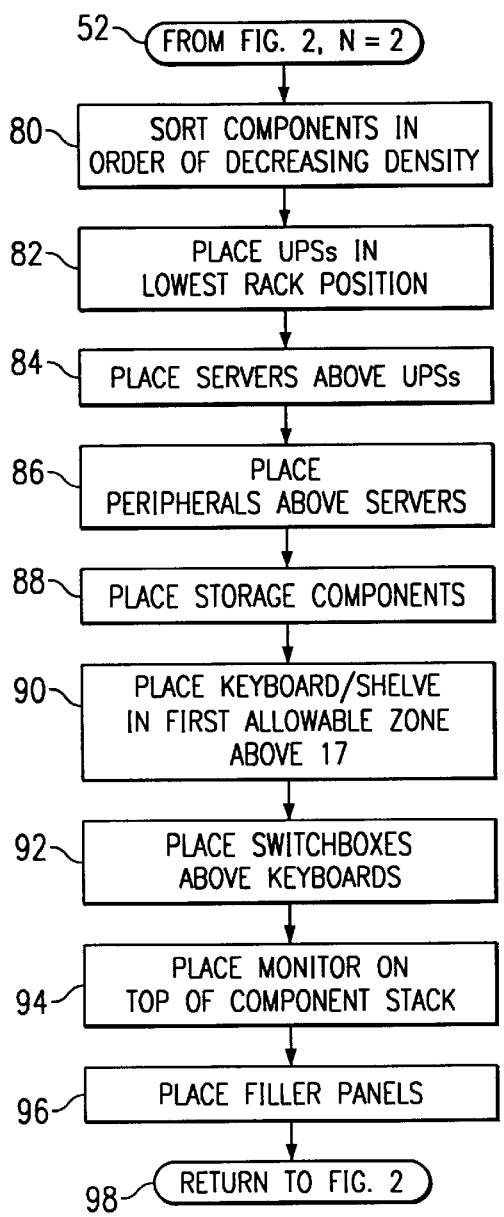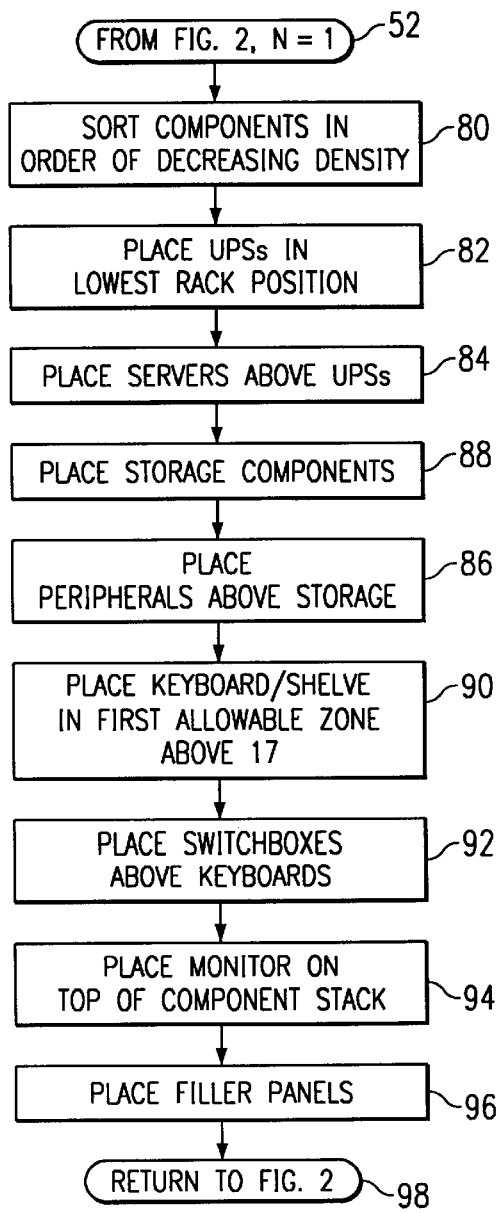
FIG. 3A
FIG. 3B

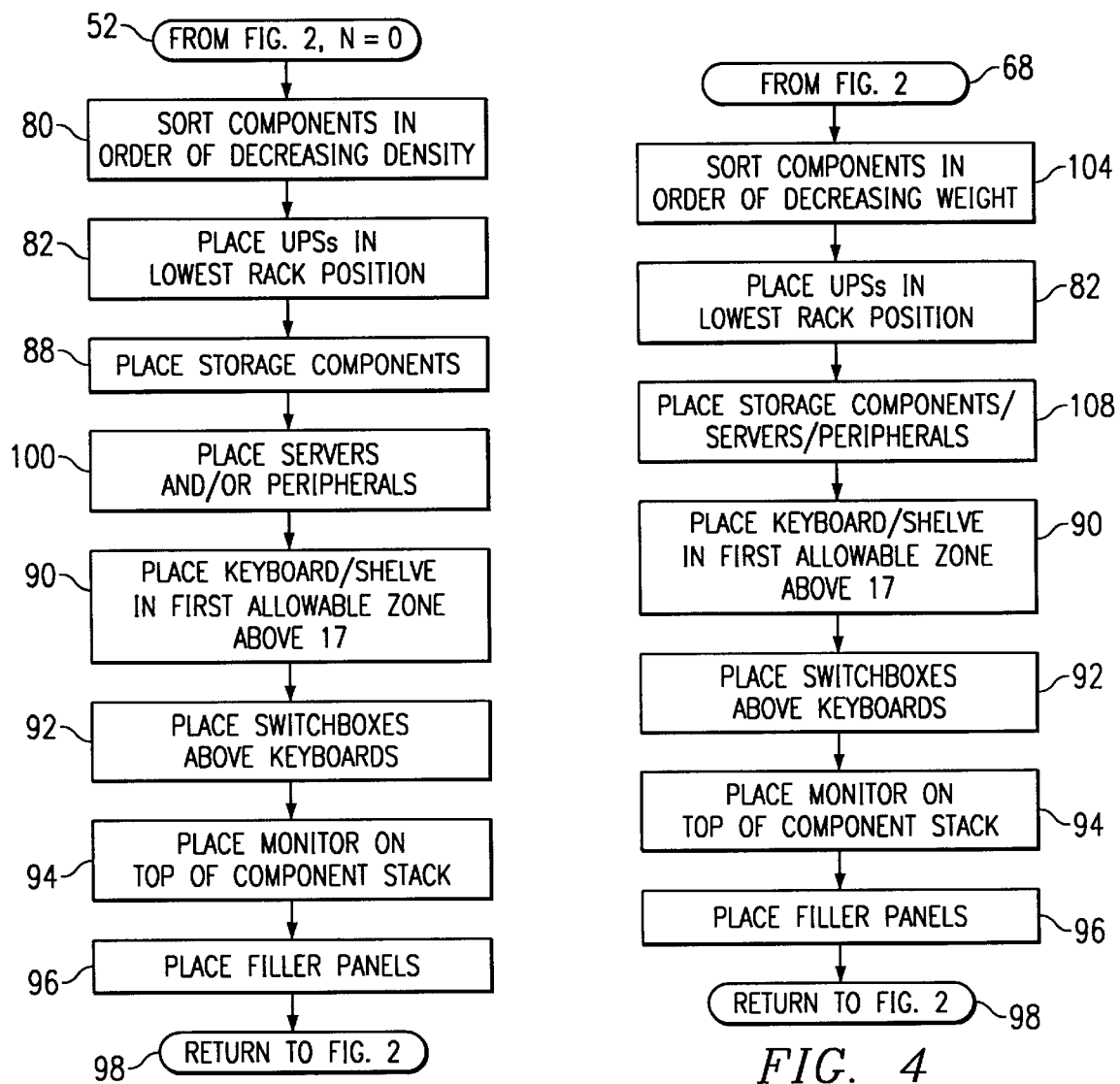
FIG. 3C
FIG. 4
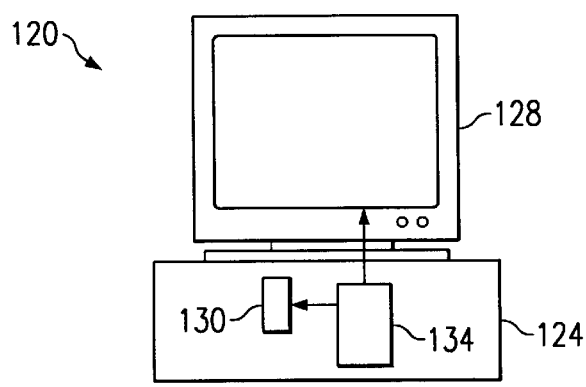
FIG. 5

METHOD AND SYSTEM FOR ADAPTIVE COMPONENT PLACEMENT

TECHNICAL FIELD OF THE INVENTION

The present invention relates in general to component placement systems and, more particularly, to a method and system for adaptive component placement.

BACKGROUND OF THE INVENTION

Users often desire to integrate several computer components into a single system. For example, a system may comprise a power supply, a server, a storage device, a monitor, and other components. The user integrates such components into a single system with the use of a rack. A rack allows for the placement of components in a modular fashion such that a user can integrate various combinations of components into the system.

Conventional tools assist users in developing a configuration of the components within the racks. The configuration comprises the placement of each component within the rack. For example, one conventional tool comprises a software tool that receive an input of the components to be placed in a rack and output a configuration of the rack.

The conventional tools use a weight-based algorithm to derive the configuration. A weight-based algorithm places the heaviest components lowest in the rack.

One problem with such a configuration, and thus the tools that derive the configuration, is that it places components in a position that makes it difficult to expand the system. For example, users often need to place storage components and server components within a rack. In such systems, the storage components can be heavier and more dense than the server components. As a result, conventional configuration tools configure the rack such that the storage components are lower in the rack than the server components. This configuration makes it difficult to add additional storage components because the servers are located above the storage components. A user must first move and reinstall the server in order to free up rack position adjacent to the existing storage components.

Another problem with placing a server component above a storage component is that it makes it difficult to slide the server component. Server components can be installed onto rails which slide to allow access to the server expansion slots. As such, the higher a server is located, the more difficult it is to slide out the server to access the expansion slots.

Another conventional solution to the problem of configuration is for a user to simply place the components in the most desirable position. This presents a problem, because the configuration may be unsafe. If the user creates a configuration wherein the rack has a high center of gravity, the rack may be prone to tipping.

SUMMARY OF THE INVENTION

In accordance with the present invention, a method and system for adaptive component placement are disclosed that provide significant advantages over prior developed component placement systems. The present invention optimizes rack configuration without compromising safety.

According to one aspect of the present invention, a method comprises generating a configuration. The configuration comprises a placement of components within a rack. The method further comprises computing a center of gravity of the configuration. The method includes determining if the center of gravity exceeds a maximum center of gravity.

According to another aspect of the present invention, a system for adaptive component placement comprises a plurality of optimization levels and an execution engine. The execution engine comprises software for execution on a computing platform. The execution engine is operable to select a selected level out of the plurality of optimization levels. The execution engine is further operable to generate a configuration based upon the selected level, the configuration comprising a placement of components within a rack. The execution engine is also operable to compute a center of gravity of the configuration and determine if the center of gravity exceeds a maximum center of gravity. The execution engine is further operable to repeat the selecting, generating, computing, and determining steps until the center of gravity of the configuration does not exceed the maximum center of gravity.

It is a technical advantage of the present invention that it can derive an optimal configuration of the various components, such that the completed system is easier to use. For example, the system can derive a configuration with a server component placed below a storage component. This allows for easier access to the server as well as easier expansion by addition of storage components.

It is another technical advantage that the present invention can determine an optimal rack configuration without compromising safety.

Other technical advantages should be apparent to one of ordinary skill in the art in view of the specification, claims, and drawings.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein:

FIGS. 3A through 3C are flow diagrams of optimization levels of one embodiment of a method for adaptive component placement;

FIG. 4 is a flow diagram a weight-based algorithm of one embodiment of a method for adaptive component placement; and FIG. 5 is a block diagram of a system for adaptive component placement.

DETAILED DESCRIPTION OF THE INVENTION

Figure 1:
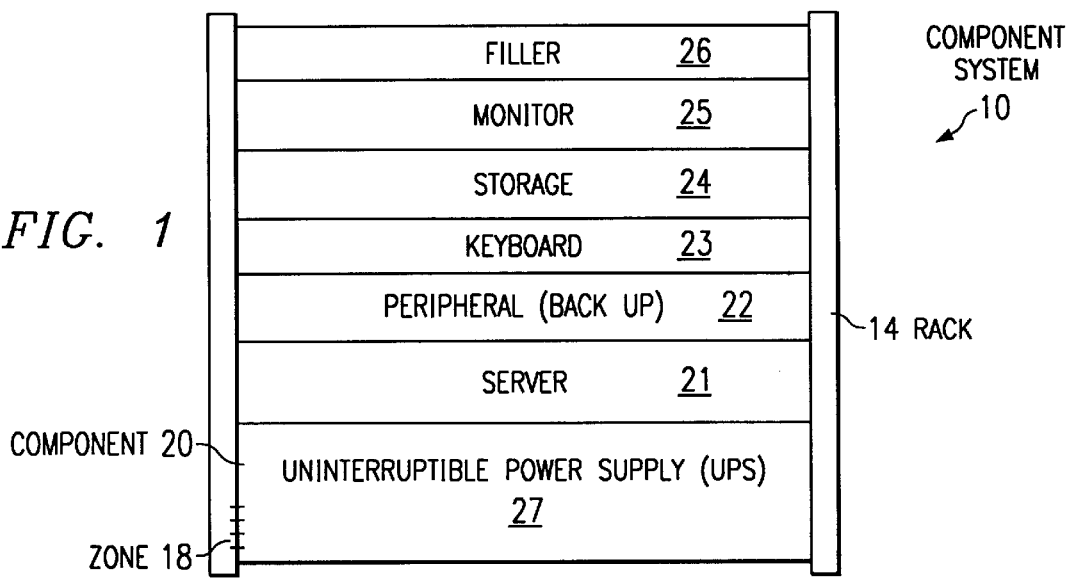
FIG. 1 is a block diagram of a populated component rack configured according to one embodiment of a method for adaptive component placement.

FIG. 1 is a block diagram of a populated component rack configured according to one embodiment of a method for adaptive component placement. A component system 10 comprises a rack 14 populated with components 20. Rack 14 is divided into multiple zones 18. For example, zones 18 can comprise segments of rack 14 that are 1.75 inches tall. Positions along rack 14 can then be referenced a particular zone 18. For example, "zone 20" could be the 20th zone located above the bottom of rack 14.

In the embodiment of FIG. 1, components 20 comprise: a power supply component 27 such as an uninterruptible power supply (UPS), a server 21 component, a peripheral component 22, a keyboard component 23, a storage component 24, a monitor component 25, and a filler panel 26. The configuration of component system 10, then, is the order in which components 20 are placed into rack 14.

There are advantages from a usability standpoint to the configuration such as shown in FIG. 1. For example, server component 21 can be a POWEREDGE server by DELL COMPUTER CORPORATION. The installation of a POWEREDGE server includes rails into rack 14 such that the POWEREDGE server slides to allow access to expansion slots. Locating server component 21 lower in the configuration makes it easier to slide server 21 out and access the slots.

Another advantage of the configuration of component system 10 is the placement of storage component 24 at a higher level and above server component 21. The advantage of such a placement allows for the addition of additional storage components 24 by easily moving the monitor component 25 upward.

The configuration of FIG. 1 is possible and determined through the present invention, even though storage component 24 may be heavier than server component 21. A conventional system using a weight-based algorithm would configure component system 10 such that a lighter server component 21 is above a heavier storage component 24. Therefore, the present invention provides an advantage over conventional systems by allowing optimal placement of components 20.

The embodiment shown below in FIG. 2 and FIGS. 3A through 3C and 4 allows for adaptive component placement. First, an optimal configuration from a usability standpoint is attempted. If this optimal configuration fails due to safety concerns, as determined by a center of gravity test, several other optimization levels are attempted. If these subsequent configurations also fail from a safety standpoint, the method resorts to a weight-based algorithm.

Figure 2:
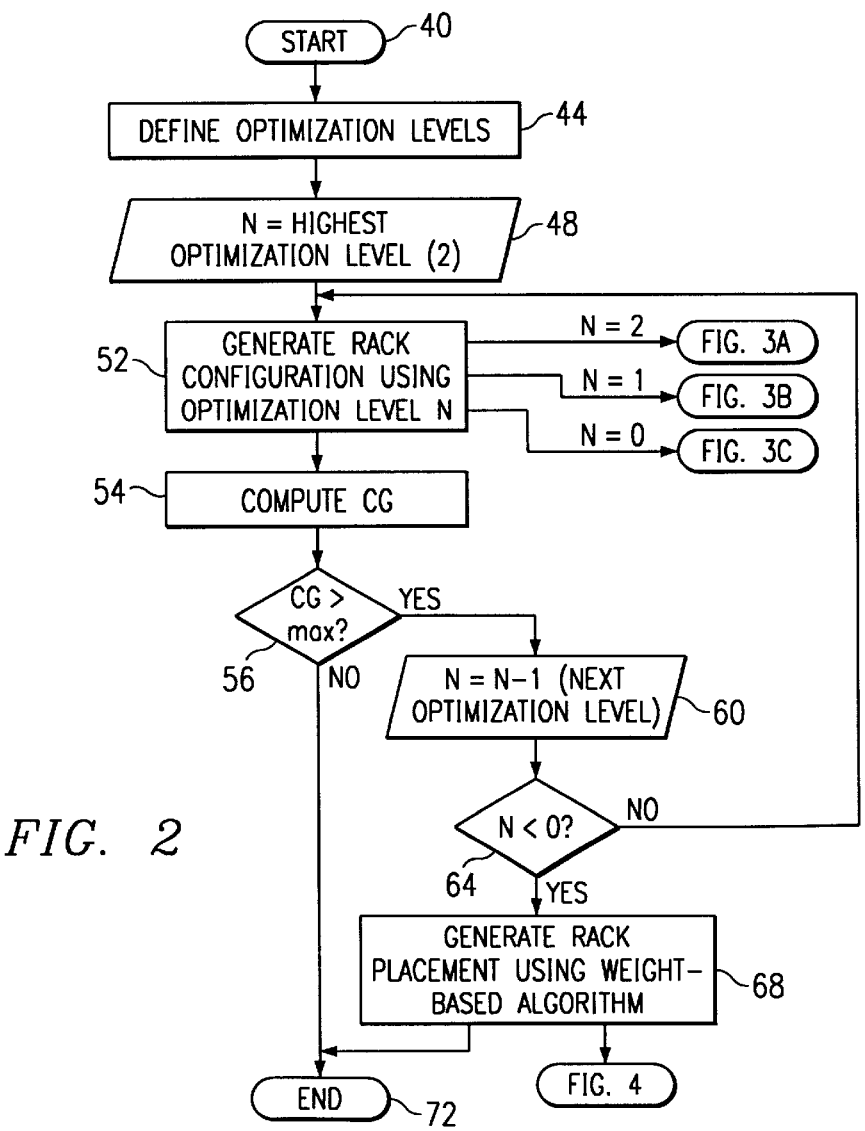
FIG. 2 is a flow diagram of one embodiment of a method for adaptive component placement.

FIG. 2 is a flow diagram of one embodiment of a method for adaptive component placement. The method of FIG. 2 begins at step 40. At step 44, a plurality of optimization levels are defined. For example, as discussed below, the present embodiment includes four optimization levels. At step 48, the highest optimization level is selected. In the embodiment of FIG. 2, the optimization level is defined as "N", the highest of which is "2."

At step 52, a configuration is generated using the selected optimization level. The generation of such a configuration using the highest optimization level is discussed with respect to FIG. 3A as noted on FIG. 2. The result of the generating step at step 52 is an ordering of components within the rack. At this point in the method of FIG. 2, the configuration comprises a model of the theoretical placement of the components within the rack. This configuration allows for some modeling and modification such that a final configuration can be determined.

Next, at step 54, the center of gravity of the configuration is computed. At step 56, this computed center of gravity is compared to a maximum center of gravity. For example, the maximum center of gravity could be computed as a function of the total height of the configuration, or as a function of the total zones occupied by the configuration. Such a maximum center of gravity can be varied for safety reasons. A configuration with a lower center of gravity resists tipping more effectively than a configuration with a higher center of gravity. A lower maximum center of gravity forces the eventual computed configuration to have a lower center of gravity, and thus be more safe.

If the comparison in step 56 determines the center of gravity of the configuration is less than the maximum center of gravity, the process ends at step 72. However, if the center of gravity is greater than the maximum center of gravity, the method proceeds to step 60. At step 60, a new optimization level is selected. In the embodiment of FIG. 2, such a selection comprises subtracting "1" from "N," meaning the next optimization level is "1."

Alternately, an embodiment of the present invention could utilize a highest optimization level of "0." In such an embodiment, "N" would be incremented at step 60 to arrive at the next optimization level.

At step 64, the optimization level is compared to zero, and if optimization is not less than zero, the method returns to step 52. At step 52, a new rack configuration is generated, this time with the second optimization level (or N=1). The process repeats until either the configuration includes a center of gravity less than the maximum center of gravity as determined at step 56, or the optimization level is less than zero as determined in step 64.

In the latter case, the method proceeds to step 68 in which a configuration is generated using a weight-based algorithm. The weight-based algorithm can be, for example, as shown in FIG. 4 and indicated by FIG. 2. In the embodiment of FIG. 2, this weight-based algorithm can also be known as a fourth optimization level. The method of FIG. 2 then ends at step 72, and outputs a configuration for the components within a rack.

FIGS. 3A through 3C are flow diagrams of optimization levels of one embodiment of a method for adaptive component placement. The method of FIG. 3A is a flow diagram of the generation of a configuration using the highest optimization level, or N=2 from FIG. 2.

At step 52, the method begins with N=2 as shown in step 52 on FIG. 2. At step 80, the components that will be placed in the configuration are sorted in order of decreasing density. This creates a sorted stack of components, sorted from a highest-density component to a lowest-density component. Then, in subsequent steps of the optimization, components are removed from this sorted stack and placed into the configuration. At step 82, the sorted stack is searched for a power supply component, for example a UPS, and it is placed in the lowest rack position. This is done because empirically, UPSs are the most dense components.

At step 84, any server components found in the sorted stack are placed above the UPSs. This is done because, as discussed above, such a configuration is more convenient from a usability standpoint, due to the common implementation of servers placed into racks on rails.

At step 86, the sorted stack is searched for peripheral components and these are placed above the servers. For example, a peripheral component could comprise a tape backup device.

At step 88, storage components are placed above the peripheral components. This is done for usability purposes. With the storage components placed above the servers, it makes it easier to expand the amount of storage space needed.

At step 90, a keyboard component is placed at a specified height. For example, the keyboard could be placed in the first allowable zone above zone 17. Such a step is done because the keyboards must be placed at a certain height such that a user can access the keyboard.

At step 92, a switchbox is placed above the keyboard. Next, at step 94, a monitor component is selected from the sorted stack and placed on top of the component stack. This is done because typically the monitor component should be visible to a user and the top of the component stack is the best place for such use.

Lastly, at step 96, filler panels are placed where necessary. For example, filler panels may be needed between components or on top of the component stack if there are empty slots in the rack. At step 98, the method of FIG. 3A returns as indicated in FIG. 2.

The method of FIG. 3A creates a configuration optimized for usability purposes. However, as previously noted, some of the components placed near the bottom, such as the server component, are less dense than the components near the top, such as the storage components. Therefore, it is possible that such a configuration may create a center of gravity that is high, and prone to tipping.

Referring back to FIG. 2 then, if the configuration created by the method in FIG. 3A, fails the center of gravity test of steps 54 and 56, then the method of FIG. 2 will return to step 52. At step 52, a new configuration will be generated using another optimization level.

FIG. 3B is a flow diagram of the second optimization level of one embodiment of a method for adaptive component placement. The method of FIG. 3B is similar to the method 3A. However, steps 88 and 86 are reversed. That is, after the server components have been placed in step 84, the storage components are then placed in step 88 followed by the placement of any peripheral components in step 86. Such a configuration is not as optimal from a usability standpoint because there will be more items placed above the storage components, and thus as mentioned before, it will be more difficult to add storage components. However, storage components are typically heavier and more dense than peripheral components. Therefore, the configuration generated by optimization level 2 of FIG. 3B should have a lower center of gravity as compared to the configuration generated by the method of FIG. 3A.

Referring back to FIG. 2, if the configuration generated by the method of FIG. 3B still fails the center of gravity test of steps 54 and 56, the method will return to step 52. Next, the method will generate a configuration based on the lowest optimization level as shown by FIG. 3C.

The method of FIG. 3C is similar to the methods of FIGS. 3A and 3b. However, at step 88, the storage components are placed directly after the UPSs. This is done because typically the storage components are more dense than other components. Next, in step 100, the sorted stack is searched for any server component or peripheral component. The components found in step 100 are placed into the configuration, with the more dense components placed lower in the configuration. The rest of the steps of FIG. 3C are similar to the steps of FIGS. 3A and 3B.

If the center of gravity of the configuration generated by the method of FIG. 3C still fails the center of gravity test of steps 54 and 56 on FIG. 2, the method of FIG. 2 resorts to a weight-based algorithm. In the embodiment of FIG. 2, the weight-based algorithm can also be thought of as the lowest optimization level, or fourth optimization level. The weight-based algorithm of step 68 on FIG. 2 is shown in FIG. 4.

FIG. 4 is a flow diagram of a weight-based placement algorithm of one embodiment of a method for adaptive component placement. The method of FIG. 4 begins at step 68 from FIG. 2. At step 104, the components are ordered by decreasing weight into a sorted stack. The components will be selected from the sorted stack and placed into the configuration similar to the sorted stack of FIGS. 3A through 3C. Next, at step 82, as in the other methods of configuration, the UPSs are placed in the lowest rack position of the configuration. Next, at step 108, the sorted stack is searched for storage components, server components or peripheral components. These components are placed in the configuration by weight, meaning that the heaviest items will be placed lowest in the configuration. The remaining of the steps of FIG. 4 are similar to those as discussed in FIGS. 3A through 3C. By definition, the weight-based algorithm of FIG. 4 will create a configuration that has the lowest possible center of gravity, because the components are placed for the most part with the heaviest items on the bottom of the configuration.

A computer system can implement the method of FIG. 2 and thereby create a tool to determine a configuration of components placed within a rack. FIG. 5 is a block diagram of a system for adaptive component placement. The embodiment of FIG. 5 is an example of one embodiment including software executing on a computing platform, the software programmed to operate the method of the present invention.

System 120 comprises a display device 128 and a computing platform 124. An execution engine 134 couples to a plurality of optimization levels 130 and display device 128. Execution engine 134 can comprise, for example, executable code stored on a memory device and executing on computing platform 124. Optimization levels 134 can comprise, for example, separate software stored in a storage device in computing platform 124, or alternately integrated within execution engine 134. Display device 128 can comprise, for example, a computer monitor.

In operation, execution engine 134 operates the method of the current invention. Execution module 134 selects a selected level out of the plurality of optimization levels 130 and generates a configuration based upon the selected level. The configuration comprises a placement of components within a rack. Execution engine 134 then computes the center of gravity of the configuration and determines if the center of gravity exceeds a maximum center of gravity. Execution engine 134 can repeat the selecting, generating, computing, and determining steps until the center of gravity of the configuration does not exceed the maximum center of gravity. System 120 can then display to a user the created configuration on display device 128.

Although the present invention has been described in detail, it should be understood that various changes, substitutions and alterations can be made thereto without departing from the spirit and scope of the invention as defined by the appended claims.

What is claimed is:

1. A computer implemented method for configuring a placement of computer components within a rack, comprising:

defining a plurality of optimization levels;

selecting a level out of the plurality of optimization levels comprising a first, second, third, and fourth optimization level;

generating a configuration for the placement of the computer components within the rack based upon the selected optimization level wherein the generating step based upon the first optimization level comprises:

sorting the components from a highest density component to a lowest density component into a sorted stack;

selecting from the sorted stack a power supply component, if any, and placing it in a lowest position in the configuration;

selecting from the sorted stack a server component, if any, and placing it in a lowest position in the configuration;

selecting from the sorted stack a peripheral component, if any, and placing it in a lowest position in the configuration;
selecting from the sorted stack a storage component, if any, and placing it in a lowest position in the configuration;
selecting from the sorted stack a keyboard component, if any, and placing it in the configuration at a specified height;
selecting from the sorted stack a switchbox, if any, and placing it in the configuration above the keyboard component;
selecting from the sorted stack a monitor component, if any, and placing it in the configuration, at a top of the component stack; and,
placing a filler panel, if any, in the configuration;
computing a center of gravity of the configuration; and,
determining if the center of gravity exceeds a maximum center of gravity.

2. The method of claim 1, wherein the generating step based upon the second optimization level comprises:
sorting the components from a highest density component to a lowest density component into a sorted stack;
selecting from the sorted stack a power supply component, if any, and placing it in a lowest position in the configuration;
selecting from the sorted stack a server component, if any, and placing it in a lowest available position in the configuration;
selecting from the sorted stack a storage component, if any, and placing it in a lowest available position in the configuration;
selecting from the sorted stack a peripheral component, if any, and placing it in a lowest available position in the configuration;
selecting from the sorted stack a keyboard component, if any, and placing it in the configuration, at a specified height;
selecting from the sorted stack a switchbox, if any, and placing it in the configuration, above the keyboard component;
selecting from the sorted stack a monitor component, if any, and placing it in the configuration, at a top of the component stack; and,
placing a filler panel, if any, in the configuration.

3. The method of claim 1, wherein the generating step based upon the third optimization level comprises:
sorting the components from a highest density component to a lowest density component into a sorted stack;
selecting from the sorted stack a power supply component, if any, and placing it in a in a lowest position in the configuration;
selecting from the sorted stack a storage component, if any, and placing it in a lowest available position in the configuration;
selecting from the sorted stack a peripheral component or a server component, if any, and placing it in a lowest available position in the configuration;
selecting from the sorted stack a keyboard component, if any, and placing it in the configuration, at a specified height;
selecting from the sorted stack a switchbox, if any, and placing it in the configuration, above the keyboard component;
selecting from the sorted stack a monitor component, if any, and placing it in the configuration, at a top of the component stack; and placing a filler panel, if any, in the configuration.

4. The method of claim 1, wherein the generating step based upon the fourth optimization level comprises:
sorting the components from a highest weight to a lowest weight into a sorted stack;
selecting from the sorted stack a power supply component, if any, and placing it in a lowest position in the rack;
selecting from the sorted stack a server component, a peripheral component, or a storage component, if any, and placing it at a lowest available position in the configuration;
selecting from the sorted stack a keyboard component, if any, and placing it in the configuration, at a specified height;
selecting from the sorted stack a switchbox, if any, and placing it in the configuration, above the keyboard component;
selecting from the sorted stack a monitor component, if any, and placing it in the configuration, at a top of the component stack; and
placing a filler panel, if any, in the configuration.

5. A computer implemented method for configuring placement of computer components within a rack, comprising:
defining a plurality of optimization levels;
selecting a level out of the plurality of optimization levels;
generating a configuration based upon the selected level, the configuration comprising the placement of components within the rack;
computing a center of gravity of the configuration;
determining if the center of gravity exceeds a maximum center of gravity; and
repeating the selecting, generating, computing, and determining steps until the center of gravity of the configuration does not exceed the maximum center of gravity.

6. The method of claim 5, wherein the plurality of optimization levels comprise a first, second, third, and fourth optimization level.

7. The method of claim 5, further comprising calculating the maximum center of gravity.

8. The method of claim 7, wherein the maximum center of gravity is calculated as a function of zones of a rack occupied by the configuration.

9. A computer implemented method for configuring a placement of components within a rack, comprising:
defining a plurality of optimization levels;
selecting a level out of the plurality of optimization levels comprising a first, second, third, and fourth optimization levels;
generating a configuration for the placement of components within the rack based upon the selected level wherein the generating step based upon the first optimization level comprises:
sorting the components from a highest density component to a lowest density component into a sorted stack;
selecting from the sorted stack a power supply component, if any, and placing it in a lowest position in the configuration;
selecting from the sorted stack a server component, if any, and placing it in a lowest available position in the configuration;
selecting from the sorted stack a peripheral component, if any, and placing it in a lowest available position in the configuration;
selecting from the sorted stack a storage component, if any, and placing it in a lowest available position in the configuration;

selecting from the sorted stack a keyboard component, if any, and placing it in the configuration at a specified height;

selecting from the sorted stack a switchbox, if any, and placing it in the configuration above the keyboard component;

selecting from the sorted stack a monitor component, if any, and placing it in the configuration, at a top of the component stack; and placing a filler panel, if any, in the configuration;

computing a center of gravity of the configuration;

determining if the center of gravity exceeds a maximum center of gravity;

repeating the selecting, generating, computing, and determining steps until the center of gravity of the configuration does not exceed the maximum center of gravity.

10. The method of claim 9, wherein the generating step based upon the second optimization level comprises:

sorting the components from a highest density component to a lowest density component into a sorted stack;

selecting from the sorted stack a power supply component, if any, and placing it in a lowest position in the configuration;

selecting from the sorted stack a server component, if any, and placing it in a lowest available position in the configuration;

selecting from the sorted stack a storage component, if any, and placing it in a lowest available position in the configuration;

selecting from the sorted stack a peripheral component, if any, and placing it in a lowest available position in the configuration;

selecting from the sorted stack a keyboard component, if any, and placing it in the configuration, at a specified height;

selecting from the sorted stack a switchbox, if any, and placing it in the configuration, above the keyboard component;

selecting from the sorted stack a monitor component, if any, and placing it in the configuration, at a top of the component stack; and placing a filler panel, if any, in the configuration.

11. The method of claim 9, wherein the generating step based upon the third optimization level comprises:

sorting the components from a highest density component to a lowest density component into a sorted stack;

selecting from the sorted stack a power supply component, if any, and placing it in a in a lowest position in the configuration;

selecting from the sorted stack a storage component, if any, and placing it in a lowest available position in the configuration;

selecting from the sorted stack a peripheral component or a server component, if any, and placing it in a lowest available position in the configuration;

selecting from the sorted stack a keyboard component, if any, and placing it in the configuration, at a specified height;

selecting from the sorted stack a switchbox, if any, and placing it in the configuration, above the keyboard component;

selecting from the sorted stack a monitor component, if any, and placing it in the configuration, at a top of the component stack; and placing a filler panel, if any, in the configuration.

12. The method of claim 9, wherein the generating step based upon the fourth optimization level comprises:

sorting the components from a highest weight to a lowest weight into a sorted stack;

selecting from the sorted stack a power supply component, if any, and placing it in a lowest position in the rack;

selecting from the sorted stack a server component, a peripheral component, or a storage component, if any, and placing it at a lowest available position in the configuration;

selecting from the sorted stack a keyboard component, if any, and placing it in the configuration, at a specified height;

selecting from the sorted stack a switchbox, if any, and placing it in the configuration, above the keyboard component;

selecting from the sorted stack a monitor component, if any, and placing it in the configuration, at a top of the component stack; and placing a filler panel, if any, in the configuration.

13. A system for configuring placement of computer components within a rack, the system comprising:

a plurality of optimization levels; and an execution engine comprising software for execution on a computing platform, the execution engine operable to:

select a level out of the plurality of optimization levels;

generate a configuration for the placement of the components within the rack based upon the selected level;

compute a center of gravity of the configuration;

determine if the center of gravity exceeds a maximum center of gravity; and repeat the selecting, generating, computing, and determining steps until the center of gravity of the configuration does not exceed the maximum center of gravity.

14. A computer implemented method for configuring a placement of components within a rack, comprising:

defining a plurality of optimization levels;

selecting a level out of the plurality of optimization levels; and generating a configuration for the placement of the components within the rack based upon the optimization level;

computing a center of gravity of the configuration; and determining if the center of gravity exceeds a maximum center of gravity.

15. The method of claim 14, further comprising calculating the maximum center of gravity.

16. The method of claim 15, wherein the maximum center of gravity is calculated as a function of zones of a rack occupied by the configuration.

17. The method of claim 14, further comprising:

generating, after the determining step, a new configuration;

computing a new center of gravity of the new configuration; and determining if the new center of gravity exceeds the maximum center of gravity.

18. The method of claim 14, further comprising:

repeating the selecting, generating, computing, and determining steps until the center of gravity of the configuration does not exceed the maximum center of gravity.

19. The method of claim 14, wherein the plurality of optimization levels comprise a first, second, third, and fourth optimization level.

* * * * *